(12) United States Patent
Muehlegger

(10) Patent No.: US 10,197,107 B2
(45) Date of Patent: Feb. 5, 2019

(54) FRICTION ELEMENT

(71) Applicant: Miba Frictec GmbH, Laakirchen (AT)

(72) Inventor: Markus Muehlegger, Pinsdorf (AT)

(73) Assignee: Miba Frictec GmbH, Laarkirchen (AT)

( * ) Notice: Subject to any disclaimer, the term of this patent is extended or adjusted under 35 U.S.C. 154(b) by 40 days.

(21) Appl. No.: 14/912,417

(22) PCT Filed: Aug. 20, 2014

(86) PCT No.: PCT/AT2014/050178
§ 371 (c)(1),
(2) Date: Feb. 17, 2016

(87) PCT Pub. No.: WO2015/024038
PCT Pub. Date: Feb. 26, 2015

(65) Prior Publication Data
US 2016/0195143 A1 Jul. 7, 2016

(30) Foreign Application Priority Data

Aug. 23, 2013 (AT) .............................. A 50522/2013

(51) Int. Cl.
| | | |
|---|---|---|
| *F16D 13/64* | (2006.01) | |
| *F16D 13/68* | (2006.01) | |
| *F16D 13/69* | (2006.01) | |

(52) U.S. Cl.
CPC ............. *F16D 13/64* (2013.01); *F16D 13/68* (2013.01); *F16D 13/69* (2013.01); *F16D 2013/642* (2013.01)

(58) Field of Classification Search
None
See application file for complete search history.

(56) References Cited

U.S. PATENT DOCUMENTS 2,264,192 A * 11/1941 Wellman ................. F16D 13/64
 192/107 C
3,232,077 A * 2/1966 Binder .................... F16D 13/68
 464/91

(Continued)

FOREIGN PATENT DOCUMENTS

| CN | 101529109 A | 9/2009 |
| CN | 101675261 A | 3/2010 |

(Continued)

OTHER PUBLICATIONS

International Search Report of PCT/AT2014/050178, dated Feb. 6, 2015.

*Primary Examiner* — Jacob S. Scott
*Assistant Examiner* — Ryan P Dodd
(74) *Attorney, Agent, or Firm* — Collard & Roe, P.C.

(57) ABSTRACT

A friction element includes a friction lining that is connected to a lining carrier, and includes a carrier element, wherein the lining carrier is connected to the carrier element, and a connecting element is also used to connect the lining carrier to the carrier element, the connecting element being guided through a recess in the lining carrier and a recess in the carrier element, and having a connecting element head that is supported on the lining carrier. The lining carrier has a shoulder in the region of the connecting element head, the internal dimension of which shoulder is greater than the external dimension of the connecting element head, such that at least part of the connecting element head is accommodated in the shoulder.

7 Claims, 2 Drawing Sheets

(56) References Cited

U.S. PATENT DOCUMENTS

| | | | | |
|---|---|---|---|---|
| 3,696,902 A | * | 10/1972 | Dantele | F16D 13/64 192/107 C |
| 3,809,200 A | * | 5/1974 | Smales | F16D 13/64 192/107 C |
| 4,076,106 A | * | 2/1978 | Bermingham | F16D 65/122 188/250 G |
| 4,113,078 A | * | 9/1978 | Maycock | F16D 13/64 192/107 C |
| 4,377,225 A | * | 3/1983 | Lech, Jr. | F16D 13/64 192/107 C |
| 4,741,424 A | * | 5/1988 | Kitano | F04B 39/04 188/251 A |
| 4,858,742 A | * | 8/1989 | Cameron | F16D 13/64 192/107 C |
| 5,048,659 A | * | 9/1991 | Tojima | F16D 13/64 192/107 C |
| 5,085,307 A | * | 2/1992 | Scheer | F16D 13/64 192/107 C |
| 5,857,551 A | * | 1/1999 | Yoneda | F16D 13/64 192/107 C |
| 5,927,460 A | * | 7/1999 | Ament | F16D 13/64 192/107 C |
| 2008/0060893 A1 | * | 3/2008 | Thorp | F16D 65/12 188/251 A |

FOREIGN PATENT DOCUMENTS

| | | | |
|---|---|---|---|
| CN | 102207137 A | | 10/2011 |
| DE | 196 26 686 A1 | | 1/1997 |
| DE | 602 01 263 T2 | | 9/2005 |
| DE | 10 2004 038 802 A1 | | 2/2006 |
| DE | 102004038802 A1 | * | 2/2006 ............... 13/64 |
| DE | 112008001240 T5 | | 4/2010 |
| EP | 2 703 684 A1 | | 3/2014 |
| FR | 2 916 028 A1 | | 11/2008 |
| GB | 566 650 A | | 1/1945 |
| GB | 2 303 672 B | | 2/1997 |
| GB | 2 442 103 A | | 3/2008 |
| WO | 02/073059 A1 | | 9/2002 |
| WO | 2005/035328 A2 | | 4/2005 |
| WO | 2007/060391 A1 | | 5/2007 |

* cited by examiner

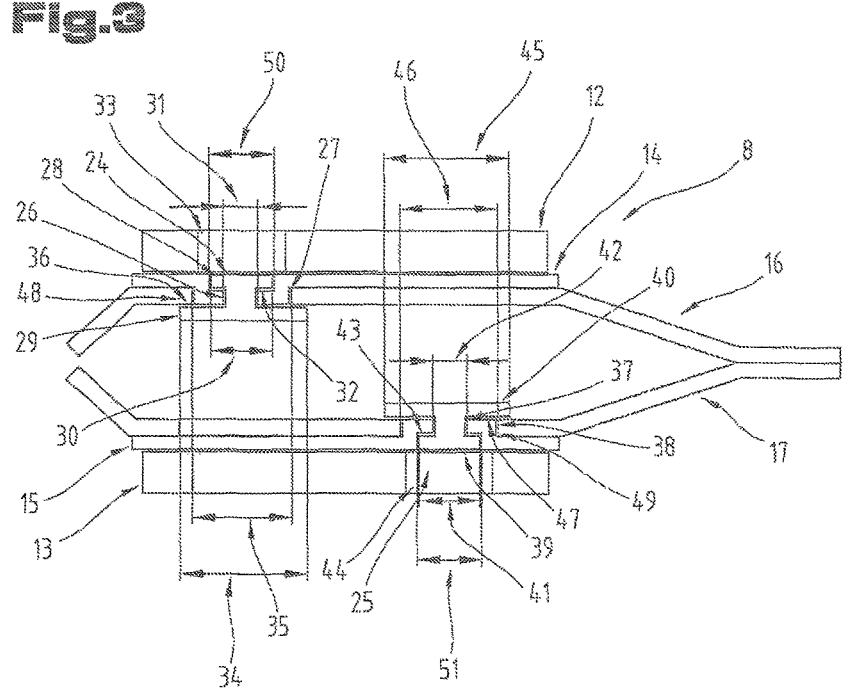
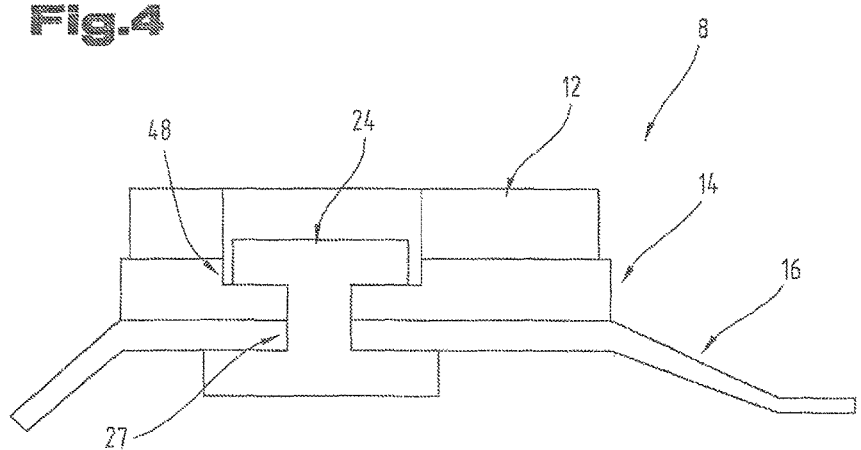

FRICTION ELEMENT

CROSS REFERENCE TO RELATED APPLICATIONS

This application is the National Stage of PCT/AT2014/050178 filed on Aug. 20, 2014, which claims priority under 35 U.S.C. § 119 of Austrian Application No. A 50522/2013 filed on Aug. 23, 2013, the disclosure of which is incorporated by reference. The international application under PCT article 21(2) was not published in English.

The invention relates to a friction element comprising a friction lining, which is arranged on a lining carrier and connected to the latter, as well as a carrier element, wherein the lining carrier is connected to the carrier element, wherein also for the connection of the lining carrier to the carrier element a connecting element is used which is guided through a recess in the lining carrier and a recess in the carrier element, wherein the connecting element comprises a connecting element head which has a greater external dimension than an internal dimension of the recess in the lining carrier, so that the connecting element head lies on the lining carrier. The invention also relates to a coupling disc for a friction coupling comprising a plurality of friction elements. The invention also relates to a method for producing a friction element comprising a friction lining, which is arranged on a lining carrier and is connected to the latter, as well as a carrier element, wherein the lining carrier is connected to the carrier element, wherein also for the connection of the lining carrier to the carrier element a connecting element is used which is guided through a recess in the lining carrier and a recess in the carrier element, wherein the connecting element comprises a connecting element head, which has a greater external dimension than an internal dimension of the recess in the lining carrier, so that the connecting element head lies on the lining carrier.

Friction linings for coupling discs are largely connected by rivet connections to the respective carrier elements of the friction linings, as explained in more detail in the following. For the connection the friction linings are arranged on friction lining carriers, for example are sintered onto the latter. The actual connection is performed between said friction lining carriers and the carrier elements. A disadvantage of this connection is that the rivet heads extend into the friction lining, so that the available wearing volume is reduced by the rivet heads.

To avoid this disadvantage it has been proposed in the prior art in general to omit the rivet heads. Thus DE 196 26 686 A1 describes a method for securing a friction element consisting of a support and friction lining attached to the latter onto a support part by means of a rivet-like connection, wherein the support part has at least one recess for forming said connection and this connection is formed in that the support part and the support are placed at least partially on top of one another and the material of the support in the region of the recess of the support part is pushed by deformation axially through said recess, so that a hollow shoulder is formed, wherein the support part is used as a die during the deformation and then the area of the shoulder protruding on the side of the support part facing away from the support is flanged in the manner of a rivet head. A disadvantage of this is that the friction linings are not replaceable so that after the total wear of the usable wearing volume of the friction linings the whole coupling disc has to be replaced.

The underlying objective of the present invention is to make it possible to increase the usable wearing volume of replaceable friction linings.

Said objective is achieved with the aforementioned friction element in that the lining carrier has a shoulder in the region of the connecting element head, wherein an internal dimension of the shoulder is greater than the external dimension of the connecting element head, so that the connecting element head is received at least partly in said shoulder. Furthermore, the objective is achieved with the coupling disc in that the friction elements are designed according to the invention. Lastly, the objective is also achieved by the aforementioned method, according to which the lining carrier is formed in the region of the connecting element head by a shoulder, wherein an internal dimension of the shoulder is designed to be greater than the external dimension of the connecting element head, so that the connecting element head is received at least partly in said shoulder.

An advantage of this is that by means of this embodiment of the friction element it is possible to achieve a significant increase in the possible wearing volume. Compared to conventional riveting in this way with the same friction lining thickness and in particular the same inertia there can be an increase in the possible wearing volume of up to a third. The friction linings still remain replaceable however, in that the connecting elements simply have to be removed. This can be performed for example by boring the rivets, as already known. Furthermore, it is also thus possible to make the friction linings thinner with a uniform period of use, whereby it is possible to reduce costs. This advantage is supported further by the use of a deep-drawing process, and this method can be integrated, relatively easily into an existing production run, and thus also an automatic processing of the friction elements is possible for producing the desired geometry. Thus by a relatively simple means a significant advantage can be achieved with regard to the friction elements.

According to one embodiment variant of the friction element the recess in the carrier element can be larger than the recess in the lining carrier and the shoulder of the lining carrier extends in the region of the recess in the carrier element into said recess. According to a preferred embodiment variant of the method the lining carrier in the region of the recess in the carrier element is deep-drawn. It is thus possible with a uniform wearing volume of the friction linings to make the friction elements thinner, whereby the required axial installation space of the friction elements and in particular also the coupling disc can be reduced. By means of the deep-drawing process in addition the automation of the fixing of the lining carrier to the friction lining on the carrier element can be improved further.

It is also possible that the shoulder is mounted in a form-fitting manner in the recess of the carrier element. According to the corresponding embodiment variant of the method it is possible that the lining carrier is connected by the shoulder in a form-fitting manner to the carrier element. In this way it is possible that the connecting elements only have the function of axially securing the connection. The connecting elements can thus be designed to be thinner.

Preferably, a height of the connecting element head is such that the latter is at a maximum as large as a layer thickness of the lining carrier. In this way the connecting element head can be mounted fully in the shoulder of the lining carrier, whereby the aforementioned effects can be improved with respect to the possible wearing volume of the friction lining.

For a better understanding of the invention, the latter is explained in more detail with reference to the following Figures.

In a schematically much simplified representation:

FIG. 3 is a friction assembly comprising two friction elements according to the invention in cross-sectional side view;

FIG. 4 is an embodiment variant of a friction element in cross-sectional side view.

Figure 1:
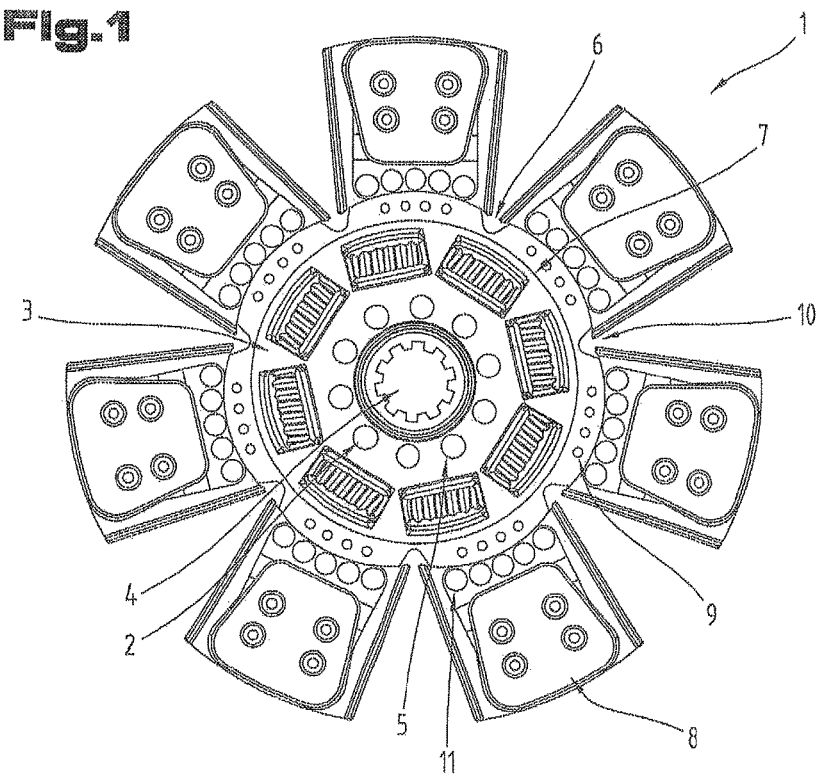
FIG. 1 is a coupling disc in axial view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows an embodiment variant of a preferred coupling disc 1 for it friction coupling known per se from the prior art.

The coupling disc 1 corresponds essentially to those known from the prior art. In this case "essentially" means that—as explained in more detail in the following—there are differences with respect to the structure of the friction elements arranged on the outer circumference.

Accordingly, the coupling disc 1 comprises, in particular a disc-like main body 2. On or in the main body 2 a plurality of torsion springs 3 are arranged. In addition, a recess 4 is formed centrally for mounting a not shown shaft. As this is known in principle from the prior art, for details reference is made to the relevant literature.

The main body 2 comprises a disc-like support 5. The support 5 is arranged at least in the area of an outer circumference 6 of the main body 2. Preferably, the support 5 extends over the whole main body 5, i.e. from the recess 4 up to the outer circumference 6. The recess 4 is preferably (also) formed in the support 5. Furthermore, preferably the torsion springs 3 are arranged in corresponding mounts in the support 5.

It is also possible that on both sides of the support 5, in particular disc-like, cover elements (not shown) are arranged at least in some parts.

Preferably, the support 5 is made from a metal sheet, in particular a steel sheet.

It is also preferable, if the support 5 is made in one piece, i.e. is not composed of a several parts.

There are a plurality of receiving areas 7 distributed on the outer periphery 6 of the support 5, in particular distributed regularly, for receiving wing-like friction elements 8. In the specific, example of the coupling disc 1 shown in FIG. 1 seven receiving areas 7 and seven friction elements 8 are provided accordingly. This number should not be considered to be restrictive however. Rather more or fewer receiving areas 7 and friction elements 8 can be provided.

The receiving areas 7 are formed by flanges 9 on the carrier element 5 protruding in radial direction, in particular formed in one piece with the latter. Recesses 10 are formed between the flanges 9, so that the individual flanges 9 are not connected to one another in peripheral direction. For each friction element 8 a separate flange 9 is arranged or formed on the support 5.

The friction elements 8 are connected in the receiving areas 7 to the support 5. In addition, bore are provided preferably both in the flanges 9 and on the friction elements 8, so that a friction element 8 is connected respectively to a flange 9 by a plurality of rivets 11, which extend through said bores.

Instead of the rivets 11 or in addition to the latter the fixing, i.e. the connection of the friction elements 8 to the flanges 9 of the support 5 can also be performed in a form-fitting manner, for example in that the end section of the friction assembly facing the receiving area 7, in particular of a friction lining carrier, is bent by at least about 90° and is inserted into a corresponding slit-like mount of the receiving area 7. The form-fitting connection can however also be formed by a dovetail-shaped design of the end section of the friction assemblies, which engage in suitably shaped recesses in the receiving areas 7.

The support 5 thus does not extend in the coupling disc 1 up to its outer circumference or outer diameter.

In principle, other methods are also known for connecting the friction elements 8 to the flanges 9, such as e.g. screws, welds, etc.

The flanges 9 are formed on the outer circumference 6 facing the friction elements 8 preferably at least almost in a curved shape, as shown in FIG. 1. In principle however they can also have a different contour.

Each of the friction elements 8 of the coupling disc 1 forms a separate assembly. Preferably, all of the friction elements 8 of the coupling disc 1 are designed to be the same.

Figure 2:
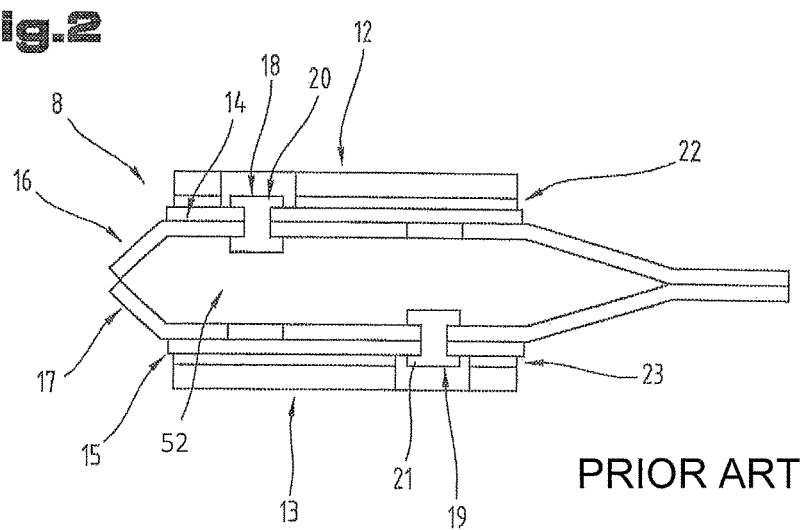
FIG. 2 is a friction assembly with two friction elements according to the prior art in cross-sectional side view.

In FIG. 2 a friction element 8 known from the prior art is shown in cross section.

The friction element 8 consists of a first friction lining 12, a second friction lining 13, a first lining carrier 14, a second lining carrier 15, a first spring element 16 and a second spring element 17.

The first friction lining 12 is connected to the first lining carrier 14, in particular sintered onto the latter. Likewise the second friction lining 13 is connected to the second lining carrier 15, in particular sintered onto the latter. However, also other connection methods can be used. For example, the first friction lining 12 can be adhered to the first lining carrier 14 or the second friction lining 13 to the second lining carrier 15, or connected in a form-fitting manner to the latter, for example soldered.

The first lining carrier 14 is riveted onto the first spring element 16, for which reason first rivets 18 are provided. The second lining carrier 15 is riveted onto the second spring element 17, for which reason second rivets 19 are provided.

The first and the second spring element 16, 17 are arranged between the first and the second lining carrier 14, 15, wherein the arrangement is such that there is sufficient space for the first and second rivets 18, 19. In addition, the first and the second spring element 16, 17 are bent accordingly, as shown in FIG. 2, so that between the first spring element 16 and the second spring element 17 an intermediate space 52 is formed.

Furthermore, the first rivets 18 and the second rivets 19 can be arranged offset to one another in radial direction and peripheral direction, as shown in FIG. 4, so that the rivet heads of the first and second rivets 18, 19 in the intermediate space do not hinder one another.

Alternatively, it is also possible that in the first and second lining carrier 14, 15 corresponding free spaces are formed which receive the rivet heads of the rivets 18, 19, so that the rivet heads do not project over the lining carriers 14, 15.

The arrangement of the friction linings 12, 13 on resilient lining carriers 14, 15 is performed mainly so that the metal or metal-ceramic friction linings 12, 13 on engagement do not experience any hits or impact, whereby said friction linings 12, 13 suffer premature damage in some circumstances. Such metal or metal-ceramic friction linings 12, 13 are much less elastic compared to other friction linings, for example those made of resin-bonded fibers. Furthermore, said metal or metal-ceramic friction linings 12, 13 have the advantage compared to other friction linings, that in this way higher torques can be transmitted. By means of the resilient arrangement of the friction linings 12, 13 it is also possible that the metering control of the coupling can be improved during coupling.

As shown in the representation in FIG. 2, first rivet heads 20 of the first rivets 18 and second rivet heads 21 of the second rivets 19 project respectively into the first friction lining 12 or second friction lining 13, so that of the first and the second friction lining 12, 13 a first layer 22 or a second layer 23 cannot be used. In this way a corresponding wearing volume of the first and second friction lining 12, 13 is lost.

FIG. 3 shows a first embodiment variant of a friction element 8 according to the invention.

The friction element 8 comprises and/or consists of the first friction lining 12, which is arranged on the first lining carrier 14 and is connected to the latter, the fast spring element 16, from which the first lining carrier 14 is arranged and connected to the latter, the second friction lining 13, which is arranged on the second lining carrier 15 and is connected to the latter, the second spring element 17, from which the first lining carrier 14 is arranged and connected to the latter. To this extent the friction element 8 does not differ from that of the prior art.

The first and the second spring element 16, 17 form respectively a carrier element for the lining carriers 14 or 15 provided with the friction linings 12 or 13.

It should be noted that this point that the carrier element(s) need not necessarily be designed as resilient elements. A rigid design of at least one of these carrier element(s) is possible within the scope of the invention. When reference is made in the following to spring elements 16, 17, said embodiments can also relate to the carrier elements with the exception of the spring effect of the spring elements 16, 17.

For connecting the first lining carrier 14 to the first spring element 16 (or carrier element) first connecting elements 24 are provided and for connecting the second lining carrier 15 to the second spring element 17 (or carrier element) second connecting elements 25 are provided.

The first and/or second connecting elements 24, 25 are preferably rivets. However, also other connecting elements are used, provided that the removal of the lining carrier from the carrier element is possible, for example screws and nuts.

With regard to the removal of riveted lining carriers for the sake of completion it should be noted that said connections can be released by drilling the rivets. Thus rivet connections are defined in the present invention as releasable connections, as distinct from material-fitting connections, as the latter can only be released with greater destruction of the connected elements.

A detachable connection is thus defined in the present invention as a connection which can be released without the destruction or solely by the destruction of the connecting element.

With regard to the number of first and/or second connecting elements 24, 25 it should be noted that preferably four first and/or second connecting elements 24, 25 are used respectively, as shown e.g. in FIG. 1. However, also less than four first and/or second connecting elements 24, 25 can be used, for example only two, wherein the latter are preferably diagonally offset to one another in this case. Diagonally refers to the first and/or second friction lining 12, 13. The following explanations about the first and/or second connecting elements 24, 25 are thereby applicable to this number with a plurality of first and/or second connecting elements 24, 25.

The first connecting element 24 is guided through a first recess 26, in particular a bore, in the first lining carrier 14 and a first recess 27, in particular a bore, in the first spring element 16. To produce the connection the first connecting element 24 comprises a first connecting element head 28 and in axial direction of the first connecting element 24 a second connection element head 29 opposite the first connecting element head 28. The two connecting element heads 28, 29 form the end sections of the first connecting element 24.

The first connecting element head 28 has a greater external dimension 30, in particular greater external diameter, than an internal dimension 31, in particular internal diameter, of the first recess 26 of the first lining carrier 14. It is thus possible that the first connecting element head 28 bears with its lower side 32 on the first lining carrier 14.

For the sake of completion it should be mentioned that also the first friction lining 12 in the region of the first connecting element 24 has a recess 33, in particular bore. The dimensions of said recess 33 are such that the first connecting element 24 can be inserted through this recess 33, in the connected state however the first connecting element 24 preferably does not touch the first friction lining 12.

The second connecting element head 29 has an external dimension 34, in particular an external diameter, which is greater than an internal dimension 35, in particular an internal diameter, of the first recess 27 of the first spring element 16. It is thus possible that the second connecting element head 29 bears with its lower side 36 on the first spring element 16.

The second connecting element 25 is guided through a first recess 37, in particular a bore, in the second lining carrier 15 and a second recess 38, in particular a bore, in the second spring element 17. To make the connection the second connecting element 25 has a third connecting element head 39 and in axial direction of the second connecting element 25 a fourth connection element head 40 opposite the third connecting element head 39. The two connecting element heads 39, 40 form the end sections of the second connecting element 25.

The third connecting element head 39 has a greater external dimension 41, in particular a greater external diameter, than an internal dimension 42, in particular inner diameter, of the second recess 37 of the second lining carrier 15. It is thus possible that the third connecting element head 39 lies with its lower side 43 on the second lining carrier 15.

For the sake of completion it should be noted that the second friction lining 13 also has a recess 44, in particular a bore, in the region of the second connecting element 25. The dimensions of this recess 44 are such however that the second connecting element 25 can be inserted through this recess 44, but the second connecting element 25 in the connected state preferably does not touch the second friction lining 13.

The fourth connecting element head 40 has an external dimension 45, in particular an external diameter, which is greater than an internal dimension 46, in particular the inner diameter, of the second recess 37 of the second spring element 17. It is thus possible that the fourth connecting element head 40 rests with its lower side 47 on the first spring element 17.

The first lining carrier 14 and the second lining carrier 15 comprise in the region of the first connection element head 28 or the third connecting element head 39 a first shoulder 48 or a second shoulder 49. A first internal dimension 50 of the first shoulder 48 or a second internal dimension 51 of the second shoulder 49 is greater than the first external dimension 30 of the first connection element head 28 or the second external dimension 41 of the third connecting element head 39. It is achieved in this way that the first connecting element head 28 is received in the first shoulder 48 or the third connection element head 39 is received in the second shoulder 49 at least partly, preferably fully, i.e. do no extend into the first friction lining 12 or the second friction lining 13. In this way the possible wearing volume of the first friction lining 12 or the second friction lining 13 can be used to a greater extent, preferably fully, for the transfer of torque.

The first internal dimension 50 of the first shoulder 48 and the second internal dimension 51 of the second shoulder 49 are measured in the plane of the first or third connecting element heads 24, 39 between the end faces of the first shoulder 48 or second shoulder 49 pointing towards one another.

The first shoulder 48 and the second shoulder 49 are formed such that the area adjoining the first recess 26 of the first lining carrier 14 or the area adjoining the second recess 37 of the second lining carrier 15 is bent downwards in the direction of the first spring element 16 or the second spring element 17, wherein the area directly adjoining the first recess 26 of the first lining carrier 14 or the area directly adjoining the second recess 37 of the second lining carrier 15 is at least approximately parallel to the first friction lining 12 or at least approximately parallel to the second friction lining 13. In these directly adjacent areas the first connecting element head 28 and/or the third connecting element head 39 are mounted. The first lining carrier 14 or the second lining carrier 15 thus have a first planar area, an adjoining second area, which is at least approximately perpendicular to the first planar area and preferably forms a web, in particular an annular web, surrounding the first connecting element head 28 or third connection element head 39, and a third area, which is at least approximately parallel to the first area and on which the first connecting element head 28 lies with its lower side 32 or the third connecting element head 39 with its lower side 47. Essentially the first shoulder 48 and the second shoulder 49 are designed to be pan-like.

The height of the second area is preferably such that the first connecting element head 28 and/or the third connecting element head 39 is mounted fully in the depression which is formed by the first shoulder 48 in the first lining carrier 14 or the second shoulder 49 in the second lining carrier 15.

Preferably, for this the first connection element head 28 or the third connecting element head 39 has a height which is at most so high as the layer thickness of the first lining carrier 14 or the second lining carrier 15 in the same direction as said height.

As viewed in cross section the first shoulder 48 and/or the second shoulder 49 in the region around the first recess 28 in first lining carrier 14 or in the region around the second recess 37 in the second lining carrier 14 has an at least approximately L-shaped path, as shown in FIG. 3.

It should be noted that all of the recesses, described above can be or are designed as openings.

The first shoulder 48 and the second shoulder 49 are preferably formed by deep-drawing the first lining carrier 14 or the second lining carrier 15 in these areas. However, other methods are also possible for the formation of the first shoulder 48 or the second shoulder 49, for example pressing, etc.

Preferably, a portion of the first shoulder 48 is received in the first recess 27 in the first spring element 16 or a portion of the second shoulder 49 is received in the second recess 38 in the second spring element 17. In addition, the first recess 27 in the first spring element 16 or the second recess 38 in the second spring element 17 can be greater than the first recess 26 in the first lining carrier 14 or greater than the second recess 37 in the second lining carrier 15.

It is thus also preferable, if the first recess 27 in the first spring element 16 or the second recess 38 in the second spring element 17 is so much greater than between the first lining carrier 14 and the first spring element 16 in the region of the first shoulder 48 or between the second lining carrier 15 and the second spring element 17 in the region of the second shoulder 49 a form-fit is formed. This can be achieved for example in that in a first step the first lining carrier 14 with the first friction lining 12 is laid on the first spring element 16 and the second lining carrier 15 with the second friction lining 13 is laid on the second spring element 17 and then the first shoulder 48 and/or the second shoulder 49 are formed for example by deep-drawing, so that the material of the first lining carrier 14 is laid on the material of the first spring element 16 and/or the material of the second lining carrier 15 is placed on the material of the second spring element 17.

As shown in FIG. 3, the second connecting element head 29 of the first connection element 24 lies on the first lining carrier 14 in the region of the first shoulder 48 and the fourth connecting element head 40 of the second connection element 25 lies on the second lining carrier 15 in the region of the second shoulder 49.

FIG. 4 shows a further and possibly independent, but not preferred, embodiment of the friction element 8, wherein the same reference numerals and component names have been used for the same parts as in the preceding FIGS. 2 and 3. To avoid unnecessary repetition reference is made to the detailed description of the preceding FIGS. 2 and 3.

It is shown that the first lining carrier 14 is arranged on the first friction lining 12 and connected to the latter. The first lining carrier 14 is connected by at least one first connecting element 24, as described above.

In this embodiment variant of the friction element 8 the first shoulder 48 is not formed by deep-drawing the first lining carrier 14 or a comparable method but for example by a machining method. Thus a depression is formed in the first lining carrier 14, in which the depression the first connecting element head 28 is received at least partly.

A further difference of said embodiment variant of the friction element 8 is that the first lining carrier 14 does not extend into the first recess 27 in the first spring element 16, but lies fully flat on the latter. The first recess 26 in the first lining carrier 14 and the first recess 27 in the first spring element 16 can therefore be made smaller so that the middle part of the first connecting element 24 can be guided between the first connecting element head 28 and the second connecting element head 29 straight through said recesses 26, 27.

In all of the embodiment variants of the friction element 8 the first internal dimension 50 of the first shoulder 48 and the second internal dimension 51 of the second shoulder 49 can be selected so that between the first connecting element head 28 and the first lining carrier 14 or between the third connecting element head 39 and the second lining carrier 15 in the region of the lateral end faces of the first or third connecting element head 28, 39 frictional connection is formed. In other words, the first internal dimension 50 of the first shoulder 48 or the second internal dimension 51 of the second shoulder 48 can be designed to be so large than the first connecting element head 28 and the third connecting element head 39 just fit.

Furthermore, with more than one connecting element 24, 25, for example two or four per friction lining 12, 13, preferably all of them are designed to be the same according to the above explanations, thus in particular for all connecting elements 24, 25 corresponding shoulders 48, 49 are formed in the lining carrier 14, 15.

If a plurality of friction elements 8 are used for a coupling disc 1, preferably all of the friction elements 8 are structured to be the same.

In the aforementioned embodiment variants of the friction element 8 both sides, that is both friction linings 12, 13 are designed to be resilient, whereby the spring elements 16, 17 are provided on both sides. However, it is also possible within the scope of the invention that one of the two sides is designed to be rigid, i.e. so does not have a spring element. In this case, instead of a spring element a planar carrier element can be used. In this case also the lining carrier can have a shoulder in the aforementioned manner in which the connecting element head is received at least partly. The above embodiments can thus be transferred or applied to said embodiment variants.

However, it is also possible that the second, i.e. the rigid friction lining is connected directly to the carrier element. Preferably, the connection is material-fitting, in particular by soldering, or by an adhesive connection. In addition, it is also the case that the connection of said second friction lining to the rigid carrier element is not performed by rivets, so that the latter is thus rivet-free.

In general, the carrier element need not necessarily be a spring element. The above explanations can thus be transferred or applied to all embodiment variants in which a lining carrier for a friction lining is connected detachably to a carrier element by a connecting element of the above kind, in particular a rivet or a screw with a nut.

Furthermore, for each friction element 8 also only one friction lining can be arranged. It is thus not absolutely necessary for the friction element 8 to act on both sides for the transmission of torque, but the latter can also act on one side.

Although the friction element 8 is preferably used in coupling discs 1, the friction element can also be used in other friction assemblies, for example in brakes.

In the coupling disc 1 the two spring elements 16, 17 or both the spring element 16 and the rigid carrier element can be connected directly to the support 5, i.e. the respective flange 9, by the rivets 11 and/or in a form-fitting manner, whereby the two spring elements 16, 17 or the element 16 and the carrier element bear directly on one another in this connecting area.

Preferably, in particular in the embodiment of the coupling disc 1 each friction element 8 comprises only one first friction lining 12 and only one second friction lining 13.

Furthermore, the friction elements 8 in the coupling disc 1 are arranged at least approximately in a star shape on the support 5, as shown in FIG. 1.

The first friction linings 12 and the second friction linings 13 are preferably made from a metal or metal-ceramic sintered material usually used for this purpose. However, it is also possible to make the latter from other materials, such as e.g. resin-bonded fiber materials. Also these other types of friction linings are described in detail in the relevant literature so that reference is made to the latter here.

With regard to the adhesives which can be used for forming the adhesive points, reference is also made to the relevant literature, as the adhesion of friction linings is known per se.

The first and second lining carriers 14, 15 can be made from an iron-based material, for example steel, in particular a structural steel or a Q & T steel.

The first and second spring elements 16, 17 can be made from a spring steel, in particular a heat-resistant spring steel.

In general, the carrier elements can be made from an iron-based material, for example a steel, in particular a structural steel or a Q & T steel.

The example embodiments show possible embodiment variants of the coupling disc 1 and the friction elements 8, whereby it should be noted at this point that also various different combinations of the individual embodiment variants are possible.

Finally, as a point of formality, it should be noted that for a better understanding of the structure of the coupling disc 1 or the friction elements 8, the latter and its component parts have not been represented true to scale in part and/or have been enlarged and/or reduced in size.

| List of reference numerals | |
|---|---|
| 1 | coupling disc |
| 2 | main body |
| 3 | torsion spring |
| 4 | recess |
| 5 | support |
| 6 | circumference |
| 7 | receiving area |
| 8 | friction element |
| 9 | flange |
| 10 | recess |
| 11 | rivet |
| 12 | friction lining |
| 13 | friction lining |
| 14 | lining carrier |
| 15 | lining carrier |
| 16 | spring element |
| 17 | spring element |
| 18 | rivet |
| 19 | rivet |
| 20 | rivet head |
| 21 | rivet head |
| 22 | layer |
| 23 | layer |
| 24 | connecting element |
| 25 | connecting element |
| 26 | recess |
| 27 | recess |
| 28 | connecting element head |
| 29 | connecting element head |
| 30 | external dimension |
| 31 | internal dimension |
| 32 | lower side |
| 33 | recess |
| 34 | external dimension |
| 35 | internal dimension |
| 36 | lower side |
| 37 | recess |
| 38 | recess |
| 39 | connecting element head |
| 40 | connecting element head |
| 41 | external dimension |
| 42 | internal dimension |
| 43 | lower side |
| 44 | recess |
| 45 | external dimension |
| 46 | internal dimension |
| 47 | lower side |
| 48 | shoulder |

-continued

| List of reference numerals | |
|---|---|
| 49 | shoulder |
| 50 | internal dimension |
| 51 | internal dimension |
| 52 | intermediate space |

The invention claimed is:

1. A friction element comprising:
   a lining carrier comprising a lining carrier recess and comprising a shoulder, the lining carrier being formed from a first type of material;
   a friction lining arranged on the lining carrier and connected to the lining carrier, the friction lining being formed from a second type of material different from the first type of material;
   a carrier element connected to the lining carrier and comprising a carrier element recess, the carrier element recess being a break-through;
   a connecting element for the connection of the lining carrier to the carrier element, the connecting element being guided through the lining carrier recess and through the carrier element recess, the connecting element comprising a first connecting element head and a second connecting element head opposite the first connecting element head;
   wherein the first connecting element head has a greater external dimension than an internal dimension of the lining carrier recess, so that the first connecting element head bears directly on the lining carrier;
   wherein the first connecting element head has a lateral face extending in a direction transverse to the friction lining;
   wherein the shoulder of the lining carrier is disposed in a region of the first connecting element head;
   wherein an internal dimension of the shoulder is greater than the external dimension of the first connecting element head, so that the first connecting element head is received at least partly in said shoulder;
   wherein a frictional connection is formed between the first connecting element head and the lining carrier in a region of the lateral face of the first connecting element head;
   wherein the carrier element recess is larger than the lining carrier recess;
   wherein the shoulder of the lining carrier extends into said carrier element recess and from a first surface of the carrier element to a second surface of the carrier element, the second surface of the carrier element being disposed opposite from the first surface of the carrier element; and
   wherein the second connecting element head bears directly on the carrier element and directly on the lining carrier.

2. The friction element as claimed in claim 1, wherein the shoulder is mounted in a form-fitting manner in the carrier element recess so that a form-fit is created between the shoulder of the lining carrier and a wall surrounding the carrier element recess.

3. The friction element as claimed in claim 1, wherein the first connecting element head has a height that is at the maximum as high as a layer thickness of the lining carrier.

4. A coupling disc for a friction coupling comprising a plurality of friction elements, wherein the friction elements are designed as claimed in claim 1.

5. A method for producing a friction element, the method comprising steps of:
   providing a friction lining and a lining carrier, the friction lining being arranged on the lining carrier and being connected to the lining carrier, the lining carrier comprising a lining carrier recess and comprising a shoulder, the lining carrier being formed from a first type of material, the friction lining being formed from a second type of material different from the first type of material,
   providing a carrier element comprising a carrier element recess, the carrier element recess being a break-through,
   connecting the lining carrier to the carrier element by guiding a connecting element through the lining carrier recess and through the carrier element recess, the connecting element comprising a first connecting element head and a second connecting element head opposite the first connecting element head, the first connecting element head having an external dimension greater than an internal dimension of the lining carrier recess, so that the first connecting element head bears directly on the lining carrier, wherein the first connecting element head has a lateral face extending in a direction transverse to the friction lining, and
   deep-drawing the lining carrier in a region of the lining carrier recess so that the deep-drawn area extends into the carrier element recess and from a first surface of the carrier element to a second surface of the carrier element, the second surface of the carrier element being disposed opposite from the first surface of the carrier element,
   wherein the shoulder of the lining carrier is disposed in a region of the first connecting element head,
   wherein an internal dimension of the shoulder is greater than the external dimension of the first connecting element head, so that the first connecting element head is received at least partly in said shoulder,
   wherein a frictional connection is formed between the first connecting element head and the lining carrier in a region of the lateral face of the first connecting element head, and
   wherein the second connecting element head bears directly on the carrier element and directly on the lining carrier.

6. The method as claimed in claim 5, further comprising a step of:
   connecting the lining carrier to the carrier element in a form-fitting manner via the shoulder.

7. The friction element as claimed in claim 1, wherein the carrier element comprises a spring element.

* * * * *